US006903713B2

(12) United States Patent
Ono

(10) Patent No.: US 6,903,713 B2
(45) Date of Patent: Jun. 7, 2005

(54) LIQUID CRYSTAL DISPLAY DEVICE AND DRIVING METHOD

(75) Inventor: Shinya Ono, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 315 days.

(21) Appl. No.: 10/205,175

(22) Filed: Jul. 25, 2002

(65) Prior Publication Data

US 2003/0053018 A1 Mar. 20, 2003

(30) Foreign Application Priority Data

Jul. 25, 2001 (JP) ........................ 2001-224919

(51) Int. Cl.[7] ................................ G09G 3/36
(52) U.S. Cl. ...................... 345/87; 345/96; 345/97
(58) Field of Search ................ 345/27, 32, 204, 345/50, 54, 87, 96, 97, 84; 349/141, 132, 124, 117, 42, 156, 169, 96, 129, 84, 130, 113; 359/51, 52; 8/506

(56) References Cited

U.S. PATENT DOCUMENTS

| | | | | |
|---|---|---|---|---|
| 5,559,620 A | * | 9/1996 | Tanaka et al. | 349/132 |
| 5,706,109 A | * | 1/1998 | Yamada et al. | 349/181 |
| 6,108,064 A | * | 8/2000 | Minoura et al. | 349/130 |
| 6,151,003 A | * | 11/2000 | Tsuda et al. | 345/87 |
| 6,160,600 A | | 12/2000 | Yamazaki et al. | |
| 6,166,795 A | * | 12/2000 | Fujii et al. | 349/141 |
| 6,184,959 B1 | * | 2/2001 | Izumi | 349/124 |
| 6,226,061 B1 | * | 5/2001 | Tagusa | 349/84 |
| 6,469,683 B1 | * | 10/2002 | Suyama et al. | 345/32 |
| 6,507,381 B1 | * | 1/2003 | Katsuya et al. | 349/130 |
| 6,577,289 B1 | * | 6/2003 | Asao et al. | 345/87 |
| RE38,288 E | * | 10/2003 | Yamada et al. | 349/156 |
| 6,791,650 B2 | * | 9/2004 | Tanuma et al. | 349/141 |
| 2001/0029638 A1 | * | 10/2001 | Bobrov et al. | 8/506 |
| 2002/0180673 A1 | * | 12/2002 | Tsuda et al. | 345/87 |
| 2002/0191128 A1 | * | 12/2002 | Okumura et al. | 349/96 |
| 2004/0012740 A1 | * | 1/2004 | Joubert et al. | 349/117 |

FOREIGN PATENT DOCUMENTS

JP  2000-356786  12/2000  ........... G02F/1/136

OTHER PUBLICATIONS

Y. Saitoh et al., "A new hybrid N–TB mode LCD with two domain pixels fabricated using a photopolymer", Asia Display '95, S23–4, pp589–92.
M. Oh–e et al., "Principles and characteristics of electro–optical behaviour with in–plane switching mode", Asia Display '95, S23–1, pp577–80.
M. Ohta et al., "Development of super–TFT–LCDs with in–plane switching display mode", Asia Display '95, S30–2, pp707–10.
T. Miyashita et al., "Properties of the OCB mode for active–matrix LCDs with wide viewing angle", SID 95 Digest, 36.3, pp797–800.
Y. Tanaka et al., "Mechanism of DC offset voltage generation in hybrid aligned nematic liquid crystal displays", Jpn. J Appl Phys, 38(1999), ppL1115–L1117.

* cited by examiner

Primary Examiner—Vijay Shankar
Assistant Examiner—Prabodh M Dharia
(74) Attorney, Agent, or Firm—McGinn & Gibb, PLLC; Derek S. Jennings

(57) ABSTRACT

A liquid crystal panel includes a cell formed between substrates and disposed to face each other and severally including alignment films and, liquid crystal molecules held inside the cell, and an electrode for applying a driving electric field in a parallel direction to the liquid crystal molecules. In the liquid crystal panel, the electrode is formed on at least one of the substrates and on a side facing the liquid crystal molecules. An alignment film is formed on the substrate so as to cover the electrode and an alignment film is disposed on the opposite substrate. The alignment films and are severally selected from a horizontal alignment film and a perpendicular alignment film which are different in aligning modes.

20 Claims, 15 Drawing Sheets

(a)

(b)

CONTRAST CONTOUR MAP

CONTRAST CONTOUR MAP (b)

(a)

BACKLIGHT UNIT

BACKLIGHT UNIT

LIQUID CRYSTAL DISPLAY DEVICE AND DRIVING METHOD

BACKGROUND OF THE INVENTION

The present invention relates to liquid crystal display, more specifically, to a liquid crystal panel and a liquid crystal display device using a parallel electric field mode, and to a liquid crystal driving method using the parallel electric field mode.

Liquid crystal display devices are widely used in monitors for mobile phones, pagers, notebook computers, desktop personal computers and workstations as display devices capable of high-resolution color display. Heretofore, a simple matrix driving method and an active matrix driving method have been proposed as methods of driving the above-mentioned liquid crystal display devices for performing color display. Among these driving methods, the active matrix driving method utilizing thin-film transistors is widely adopted because of capabilities to constitute small and flat display devices and to offer high image quality.

Meanwhile, a wide viewing angle characteristic which effectuates visual identification of liquid crystal display from various angles is also required in liquid crystal display devices. As similar to other characteristics, such viewing angle enhancement is also recognized as an important problem for liquid crystal display devices.

In order to achieve the above-described viewing angle enhancement, conventionally disclosed is a liquid crystal display device using a pair of comb electrodes as a driving method to set a direction of electric fields to be applied to liquid crystal as approximately parallel to a substrate surface (such a method is hereinafter referred to as a "parallel electric field mode driving method"). FIG. 15 shows a schematic exploded perspective view of a liquid crystal panel for driving liquid crystal by a parallel electric field mode driving method conventionally known as an in-plane switching (IPS) method (M. Oh-e, M. Ohta, S. Aratani, K. Kondo, Asia Display '95, 577(1995) and M. Ohta, M. Oh-e, K. Kondo, Asia Display '95, 707 (1995)).

The liquid crystal panel using the conventional parallel electric field mode driving method shown in FIG. 15 drives liquid crystal molecules by holding a liquid crystal cell 74 between a polarizer 70 and an analyzer 72. In FIG. 15, for the convenience of explanation, the liquid crystal cell 74 is illustrated as exploded. The liquid crystal cell 74 includes transparent substrates such as glass substrates 76a and 76b and liquid crystal molecules 78 sealed between the glass substrates 76a and 76b. Each of the glass substrates 76a and 76b is provided with an alignment film 80 subjected to an alignment process in a given direction by a method such as rubbing, in order to align and fix the liquid crystal molecules 78 severally in a proper direction. Conventionally, films such as polyimide films or carbon films containing DLC are used as the alignment films 80.

In the liquid crystal cell 74 in accordance with the conventional parallel electric field mode driving method as shown in FIG. 15, unillustrated comb-shaped electrodes are formed on one of the glass substrates 76a constituting the liquid crystal cell 74 on the side facing the liquid crystal molecules, by a mode such as sputtering or vacuum deposition. As electric fields are formed between mutually opposing teeth of the comb electrodes, the liquid crystal molecules 78 are driven and liquid crystal display is thereby effectuated.

FIG. 16 is a perspective view showing a detailed constitution of a comb electrode 82 usable in the liquid crystal panel shown in FIG. 15. The comb electrode 82 shown in FIG. 16 is formed on the glass substrate 76a and has a constitution including two arrays of wiring 82a and 82b severally connected to terminals of mutually different electric potential such that the electric fields are formed between the mutually opposing teeth. The comb electrodes 82 shown in FIG. 16 are formed over a display portion of the glass substrate 76a, whereby a necessary display area is secured. The comb electrodes 82 are insulated from the liquid crystal molecules 78 with an insulative film such as the alignment film 80 which is indicated by broken lines. Accordingly, the comb electrode 82 applies electric fields necessary for driving to the liquid crystal molecules 78.

FIG. 17 is a view illustrating movement of the liquid crystal and the direction of the electric fields when the electric fields are applied from the comb electrode 82 to the liquid crystal panel shown in FIG. 15. When a voltage is applied to the comb electrode 82, then as shown in FIG. 17, an electric field as illustrated by an arrow B is formed between the opposing teeth 82a and 82b of the comb electrode 82. The liquid crystal molecules 78 change alignment thereof in accordance with the electric field B. Then the liquid crystal panel allows a direction of polarization of light A irradiated from background illuminating means such as a backlight unit to rotate in accordance with the direction of the liquid crystal molecules 78 so that the light A passes through the analyzer 72, thus effectuating display. In FIG. 17, a state of polarization of the light which passed through the liquid crystal cell 74 is illustrated by A'.

The above-described parallel electric field mode driving method possesses a favorable characteristic that brightness of the display portion of the liquid crystal panel varies largely with respect to viewing angles. By utilizing the large viewing angle characteristic, the parallel electric field mode driving method is particularly used in a wide viewing angle liquid crystal display device.

In the meantime, a vertical electric field driving method refers to a driving method to apply electric fields to liquid crystal molecules in a perpendicular direction with respect to a substrate surface. The vertical electric field driving method has been used from the beginning of researches and developments of liquid crystal displays. Enhancement of viewing angles for a liquid crystal panel has been also studied on the above-described vertical electric field driving mode. Among those studies, an OCB mode proposed by Miyashita et al (SID '95 Digest: p. 797, 1995) and a HAN mode proposed by Saitoh et al (Asia Display '95: p. 589, 1995) severally realize high-speed response. Accordingly, those modes are expected to be applied to usage such as a liquid crystal display device for movie display.

However, in an active matrix liquid crystal display device of the IPS method with a fine viewing angle characteristic, it is necessary to set a cell gap of a liquid crystal cell to 5 (micrometers) or less for realizing high-speed response, or considerably narrower than 5 (micrometers) in order to meet more practical high-speed response. In addition to such inconvenience, it is necessary to set a driving voltage upon driving as high as 10 V or higher. Meanwhile, although the above-mentioned OCB mode driving method has a fine viewing angle characteristic and requires a proper driving voltage, it is necessary to form "bent" alignment of liquid crystal molecules at an initial state. Accordingly, the OCB mode driving method has inconvenience that it is difficult to form such a "bent" state stably. Meanwhile, the HAN mode driving method is an innovative method which shows a high viewing angle and high speed response characteristic, and capable of low voltage driving as well. Nevertheless, the HAN mode is not practicable because the mode has a serious defect to generate a large residual voltage and tends to cause image sticking. In the following, description will be made in detail regarding the HAN mode driving method by use of FIG. 18.

FIG. 18 is a schematic cross-sectional view of a liquid crystal cell used in the HAN mode driving methods. As shown in FIG. 18, the conventional HAN mode driving liquid crystal cell includes a pixel electrode 86 formed on a glass substrate 84, and a common electrode 90 formed on a glass substrate 88. The respective electrodes 86 and 90 are insulated from a composition containing liquid crystal molecules by alignment films 92a and 92b. Moreover, the alignment films 92a and 92b are composed so as to have mutually different aligning modes, whereby liquid crystal display is effectuated by generating alignment variation of the liquid crystal between perpendicular alignment and horizontal alignment.

However, the above-described constitutions of the alignment films in the HAN mode driving method cause an electrically asymmetric interface characteristic inside the cell. Such an asymmetric interface characteristic is assumed to be a factor to generate the above-mentioned image sticking (Tanaka et al, Jpn. J. Appl. Phys. Vol. 38, L1115 (1999)).

SUMMARY OF THE INVENTION

Therefore, the present invention has been made in consideration of the above-described problems of the conventional liquid crystal panels. It is an object of the present invention to provide a liquid crystal panel, a liquid crystal display device and a liquid crystal driving method with high viewing angle and low voltage driving characteristics.

As a result of extensive studies in consideration of the inconvenience in the above-described conventional driving methods, the inventors of the present invention have reached the present invention by finding out that the conventional inconvenience can be resolved by applying the parallel electric field mode driving method with respect to a constitution of a liquid crystal cell according to the HAN mode driving method. Specifically, the inventors of the present invention have found out that it is possible to provide the liquid crystal cell, the liquid crystal display device and the liquid crystal driving method with high viewing angle and low voltage driving characteristics according to the present invention, without forming the electrically and physically asymmetric interface characteristic of the alignment films, which is assumed to be a reason for causing the inconvenience in the HAN mode driving method.

According to the present invention, an electrode for driving liquid crystal is constituted on one of two glass substrates sandwiching a liquid crystal layer as an active-matrix-drive comb-shaped electrode group. The comb electrode group is provided on the glass substrate on a side abutting on the liquid crystal. A perpendicular alignment film is formed so as to cover this comb electrode group. On an opposite substrate, a horizontal alignment film is formed and rubbed so that liquid crystal is aligned in one direction. A cell is formed by sealing the glass substrates with a given gap secured by use of a spacer in a manner that the sides of the alignment films thereof face each other. The liquid crystal is filled in the cell, and the cell is disposed between two polarizer plates configured in cross-nicol such that light-absorbing axes thereof are set perpendicular to each other, thus constituting a liquid crystal panel.

The inventors of the present invention has found out that, to our surprise, adoption of the above-described configuration can reduce an influence by an internal residual voltage attributable to the HAN mode while maintaining an effect thereof.

Specifically, according to the present invention, provided is a liquid crystal panel including a cell formed between substrates which are disposed to face each other and severally include alignment films, liquid crystal molecules held in the cell, and an electrode for applying a driving electric field in a direction parallel to a surface of the substrates. Here, the electrode is formed on at least one of the substrates on a side facing the liquid crystal molecules, and the alignment film disposed on the substrate to cover the electrode and the alignment film disposed on the opposite substrate are severally selected from a horizontal alignment film and a perpendicular alignment film which are mutually different in aligning modes. The electrode can be composed of plural pairs of comb electrodes which form driving electric fields for driving the liquid crystal molecules. It is preferable to dispose the perpendicular alignment film adjacently to the electrode. It is preferable that an alignment direction of the horizontal alignment film is set within 10 degrees with respect to the direction of the electric fields in a parallel direction generated by the comb electrodes. Moreover, a tilt angle of the horizontal alignment film can be set in a range from 70 to 90 degrees with respect to a thickness direction of the cell, and a tilt angle of the perpendicular alignment film can be set in a range from 0 to 30 degrees with respect to the thickness direction of the cell. Furthermore, on the liquid crystal panel, an optical compensator is disposed adjacently to either the substrate where the comb electrodes are formed or the opposite substrate. The optical compensator includes discotic liquid crystal molecules, and the discotic liquid crystal molecules can be selected from horizontal alignment and perpendicular alignment that are different from each other on a side adjacent to the substrate and on a side facing the substrate. It is preferable that the liquid crystal molecules in the cell are nematic liquid crystal molecules.

Moreover, according to the present invention, provided is a liquid crystal display device including a liquid crystal panel having a cell formed between substrates which are disposed to face each other and severally include alignment films, liquid crystal molecules held in the cell, and an electrode for applying a driving electric field in a direction parallel to a surface of the substrates, and a backlight unit. Here, the electrode is formed on at least one of the substrates on a side facing the liquid crystal molecules, and the alignment film disposed on the substrate to cover the electrode and the alignment film disposed on the opposite substrate are severally selected from a horizontal alignment film and a perpendicular alignment film which are mutually different in aligning modes. The electrode can be composed of plural pairs of comb electrodes which form driving electric fields for driving the liquid crystal molecules. It is preferable to dispose the perpendicular alignment film adjacently to the electrode. An alignment direction of the horizontal alignment film can be set within 10 degrees with respect to the direction of the electric fields in a parallel direction generated by the comb electrodes. In the present invention, a tilt angle of the horizontal alignment film can be set in a range from 70 to 90 degrees with respect to a thickness direction of the cell, and a tilt angle of the perpendicular alignment film can be set in a range from 0 to 30 degrees with respect to the thickness direction of the cell. Furthermore, on the liquid crystal panel, an optical compensator is disposed on the opposite substrate, on any one of a side adjacent to the liquid crystal molecules or on an opposite face thereto. The optical compensator includes discotic liquid crystal molecules, and the discotic liquid crystal molecules can be selected from horizontal alignment and perpendicular alignment that are different from each other on a side of the adjacent substrate and on a side facing to the substrate. It is preferable that the liquid crystal molecules in the cell are nematic liquid crystal molecules.

Furthermore, according to the present invention, provided is a driving method for a liquid crystal display device including a liquid crystal panel having a cell formed between substrates which are disposed to face each other and severally include alignment films, liquid crystal molecules held in the cell, and an electrode for applying a driving electric field in a direction parallel to a surface of the substrates, and a backlight unit. Here, the method includes the steps of: generating a parallel electric field by the electrode formed on at least one of the substrates and disposed on a side facing the liquid crystal molecules, aligning the liquid crystal molecules by the parallel electric field, transmitting a light beam from the backlight unit through the cell after polarizing the light beam, and controlling the transmission of the light beam by applying and canceling the parallel electric field.

It is preferable that the step of transmitting the light beam through the cell includes a step of transmitting the polarized light beam through alignment films severally selected from a horizontal alignment film and a perpendicular alignment film of mutually different aligning modes. The driving method may also include a step of generating the parallel electric field from plural pairs of comb electrodes for forming a driving voltage to drive the liquid crystal molecules. The driving method can also include a step of generating the parallel electric field on a side of the perpendicular alignment film. The driving method may also include a step of generating the parallel electric field within 10 degrees with respect to an alignment direction of the horizontal alignment film. A tilt angle of the horizontal alignment film can be set in a range from 70 to 90 degrees with respect to a thickness direction of the cell, and a tilt angle of the perpendicular alignment film can be set in a range from 0 to 30 degrees with respect to the thickness direction of the cell. The step of transmitting the light beam may include a step of transmitting the light beam through an optical compensator, which is disposed adjacently to an opposite side to a side abutting on the liquid crystal molecules of the substrate facing to the substrate where the comb electrodes are formed. The optical compensator may include discotic liquid crystal molecules, and the discotic liquid crystal molecules can be selected from horizontal alignment and perpendicular alignment that are different from each other on a side adjacent to the substrate and on a side facing the substrate.

BRIEF DESCRIPTION OF THE DRAWINGS

For a more complete understanding of the present invention and the advantages thereof, reference is now made to the following description taken in conjunction with the accompanying drawings.

FIGS. 13(a) and 13(b) are schematic views showing alignment variation of liquid crystal, of which FIG. 13(a) shows a state when a driving voltage at 0 V is applied to the liquid crystal panel according to the present invention, and FIG. 13(b) shows a state when a driving voltage at 5 V is applied thereto.

DETAILED DESCRIPTION OF THE PREFERRED EMBODIMENTS

Now, the present invention will be described by a preferred embodiment. However, it should be understood that the present invention is not limited to the embodiment which is particularly described in the following.

(Section A) Constitution of Liquid Crystal Panel

Figure 1:
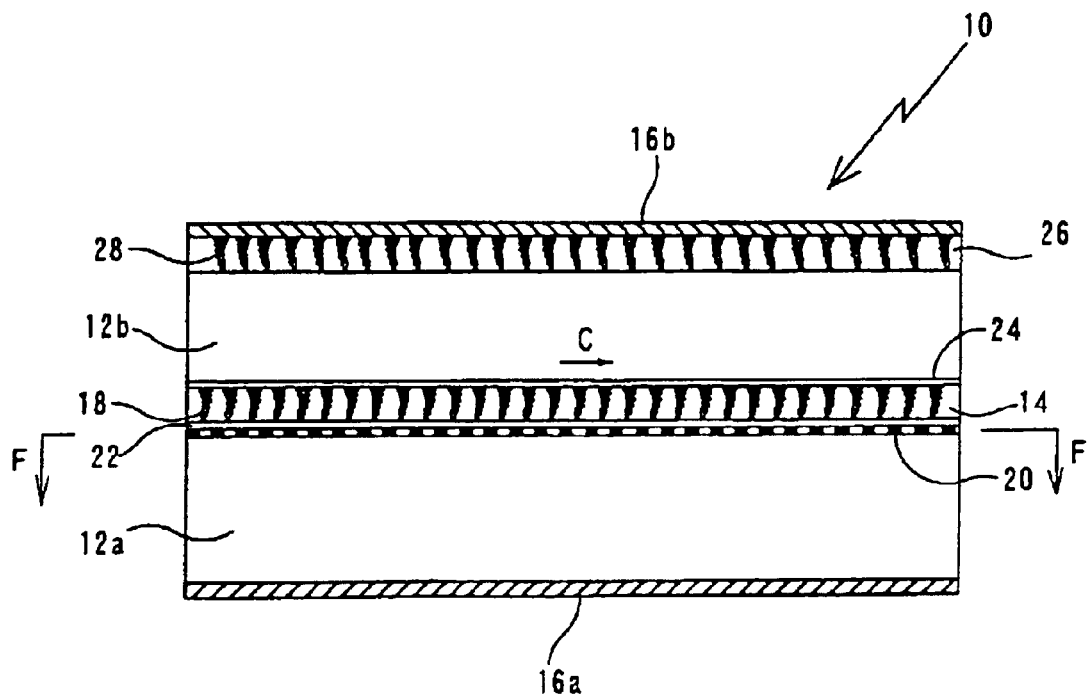
FIGS. 1(a) and 1(b) are schematic cross-sectional views of a liquid crystal panel according to the present invention.
Figure 1:
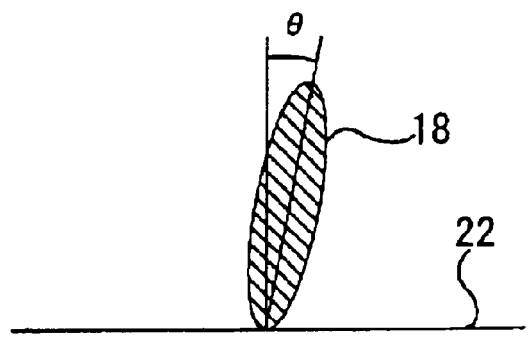

FIGS. 1(a) and 1(b) are views schematically showing a cross section of a liquid crystal panel of the present invention. FIG. 1(a) is a schematic cross-sectional view of the liquid crystal panel of the present invention. As shown in FIG. 1(a), in the liquid crystal panel 10 of the present invention, a cell 14 is constituted in a space formed between two substrates 12a and 12b which are disposed to face each other. As for the substrates usable in the present invention, substrates made of glass can be cited in particular. However, it is possible to cite any materials including high-polymer materials and inorganic materials for use in the substrates of the present invention, so far as the material possesses appropriate insulation performance, strength and optical characteristic. A gap between the substrates 12a and 12b are secured by unillustrated spacer particles or the like. Moreover, end portions of the substrates 12a and 12b are sealed with an appropriate sealing member, thus constituting the cell 14. In an embodiment for describing the present invention as illustrated in FIGS. 1(a) and 1(b), a thickness of the cell 14 is retained at 5 (micrometers) by the spacer. Although the thickness of the cell 14 is not particularly limited in the present invention, the thickness of the cell 14 can be set in a range from 4 (micrometers) to 10 (micrometers).

As for the liquid crystal molecules usable in the embodiment of the present invention to be described, nematic liquid crystal can be cited in particular. However, in addition to the foregoing, smectic liquid crystal, cholesteric liquid crystal and a mixture of any of the foregoing kinds of liquid crystal or the like can be used as appropriate. Moreover, the liquid crystal molecules used in the present invention may be filled in the cell 14 as a liquid crystal compound mixed with another chiral material. In the embodiment of the present invention as shown in FIGS. 1(a) and 1(b), used is a type of nematic liquid crystal having a value of $(\Delta)n = n_e - n_o = 0.16$. However, it is possible to use the liquid crystal of the $(\Delta)n$ value in any range in the present invention so far as the liquid crystal can perform proper display. Moreover, although the present invention uses the nematic liquid crystal having a value of $(\Delta)(\varepsilon) = (\varepsilon)_e - (\varepsilon)_o$ (is greater than) 0, a similar effect is obtained by using liquid crystal having a value of $(\Delta)(\varepsilon)$ (is smaller than) 0.

A polarizer 16a is disposed on the substrate 12a on a side opposite with the cell 14, whereby a light beam from an unillustrated backlight unit is polarized and then made incident on the cell 14. In addition, a polarizer 16b is also disposed on the glass substrate 12b on a side where the light beam is outputted. The polarizer 16b is used as an analyzer which selectively transmits the light beam of which a polarizing state is changed by alignment of the liquid crystal molecules 18. Directions of polarization of the polarizer 16a and of the polarizer 16b can be set appropriately to effectuate proper display.

To be more precise, in the embodiment of the present invention as shown in FIGS. 1(a) and 1(b), the polarizer 16a and the polarizer 16b are disposed in a cross-nicol configuration, in which angles of light-absorbing axes of the polarizers are turned by 90 degrees. Moreover, the polarizers 16a and 16b usable in the present invention can be appropriately selected from inorganic materials, organic materials and composite materials thereof so far as the material can be formed into a member such as a polarizer plate or a polarizing film which can provide an incident light beam with proper polarization.

To explain more on the liquid crystal panel 10 of the present invention by use of FIGS. 1(a) and 1(b), a comb electrode 20 composed in pairs for generating an electric field is formed on the substrate 12a on a side facing the cell 14. A plural pairs of comb electrodes 20 are formed throughout a portion required to perform display of the liquid crystal panel 10, thus forming a display area. In the present invention, the comb electrode 20 may apply any technologies previously known such as sputtering by use of an appropriate mask, vacuum deposition, or patterning by use of sputtering, vacuum deposition and photolithography.

An alignment film 22 is disposed above the comb electrodes 20 for insulating the comb electrodes 20 from a composition containing the liquid crystal molecules and for applying an electric field in a lateral direction with respect to the liquid crystal molecules. In the present invention, the lateral direction refers to a direction crosscutting the thickness direction of the cell, which is indicated by an arrow C in FIG. 1(a). In the present invention, it is preferable that the alignment film 22 for covering the comb electrodes 20 is formed as a perpendicular alignment film. As for the alignment film 22 usable in the present invention, a polyimide film or a carbon film containing DLC can be cited.

Moreover, an alignment film 24 is also provided on the substrate 12b on an opposite side across the cell 14. The alignment film 24 is formed as a horizontal alignment film and the alignment film 24 can be made of the same material as that of the alignment film 22 as described above. Initial alignment of the liquid crystal molecules given by the above-described alignment films 22 and 24 is illustrated in FIG. 1(a).

The alignment films of the present invention are formed on the mutually facing substrates 12a and 12b, severally on the sides facing the cell 14. The alignment film 24 is provided with an aligning direction by an aligning method such as rubbing. In the present invention, particularly, it is preferable to use a combination of the perpendicular alignment film and the horizontal alignment film. Note that "perpendicular" and "horizontal" refer to modes or directions of alignment used in the context of tilts of the liquid crystal molecules 18 in the present invention. To be more precise, if an angle (theta) illustrated in FIG. 1(b) is close to 0 degrees, then the alignment film is referred to as the perpendicular alignment film. Meanwhile, if the angle (theta) is close to 90 degrees, the alignment film is referred to as the horizontal alignment film. To be more precise, the perpendicular alignment film can be obtained, for example, by providing a process with a silane coupling agent or a process with a chromium complex with respect to a polyimide film, a DLC film or the like.

The embodiment for describing the present invention describes that the perpendicular alignment film is formed on the side to cover the comb electrodes 20 and that the horizontal alignment film is formed on the opposite side. However, it is also possible to form the horizontal alignment film on the side to cover the comb electrodes 20 and to form the perpendicular alignment film on the opposite side.

Concerning aligning processes to be provided on the above-described alignment films in the present invention, it is preferable that the aligning process is provided on the perpendicular alignment film so as to define a tilt angle (theta) of the liquid crystal molecule 18 under no electric field in a range from 0 to 30 degrees. Meanwhile, it is preferable that the aligning process is provided on the horizontal alignment film so as to define the tilt angle (theta) under no electric field in a range from 70 to 90 degrees.

Figure 2:
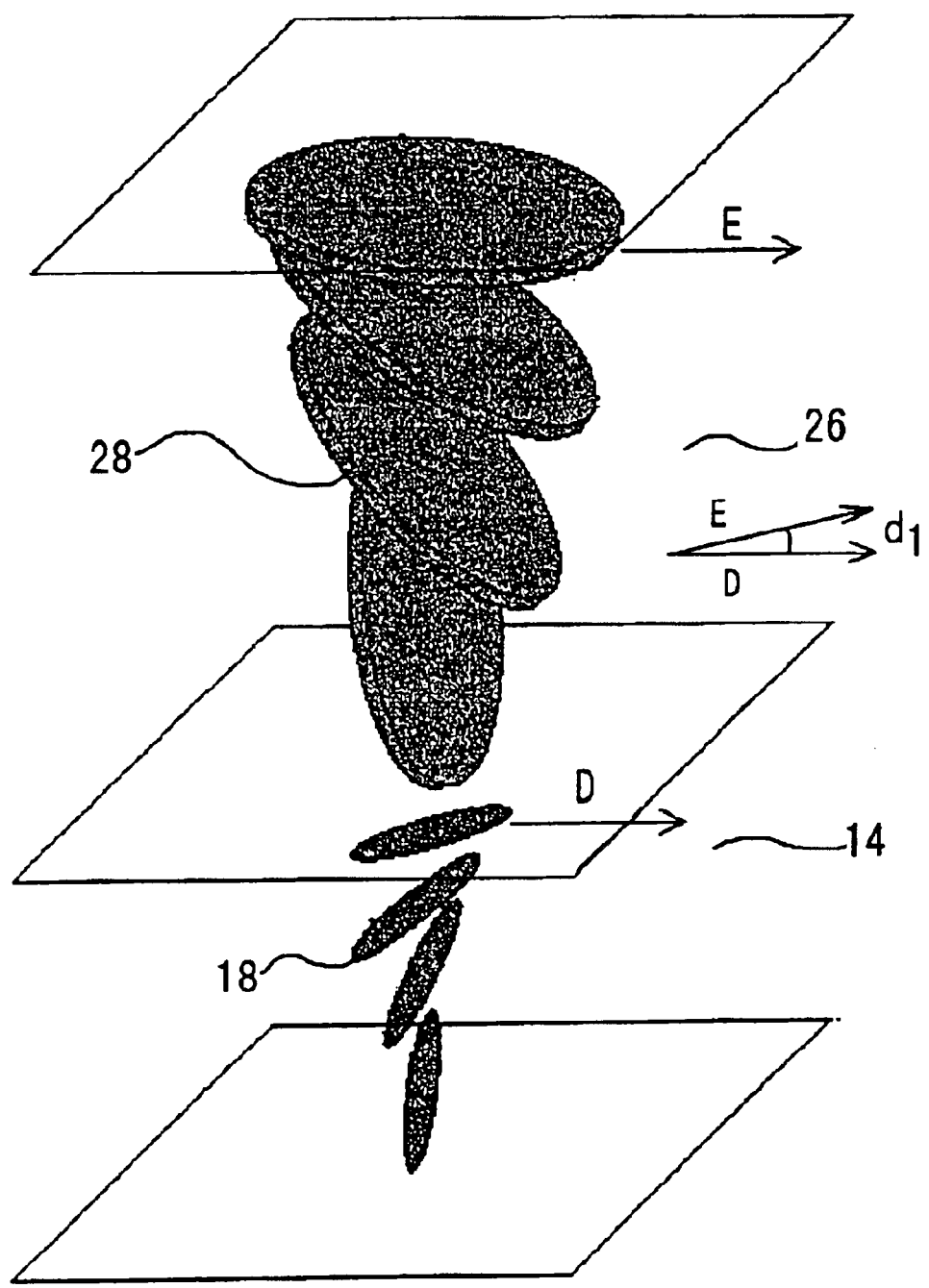
FIG. 2 is a detail view regarding a configuration of the liquid crystal cell and an optical compensator according to the present invention.

As shown in FIG. 1(a), in the liquid crystal panel 10 of the present invention, an optical compensator 26 is disposed on a plane of the glass substrate 12b on the side opposite with the cell 14. FIG. 2 is a view showing a configuration of the liquid crystal cell 14 and the optical compensator 26 in detail. The optical compensator 26 used in the present invention is made of a film containing discotic liquid crystal 28. The discotic liquid crystal 28 used therein has a value of $(\Delta)n = -0.1$. Moreover, a thickness of the optical compensator 26 shown in FIG. 2 is set to 7.5 (micrometers). Although the optical compensator 26 usable in the present invention may include any other liquid crystal or thicknesses than the foregoing description, it is preferable that the optical compensator 26 possesses characteristics to be defined in the following Section B from a viewpoint of imparting a particularly fine viewing angle characteristic.

As shown in FIG. 2, concerning alignment of the discotic liquid crystal 28 of the optical compensator 26 used in the present invention, the discotic liquid crystal 28 is disposed on the side of the glass substrate 12b inside the optical compensator 26 so as to have a tilt angle (a rubbing direction) of 3 degrees. Meanwhile, the discotic liquid crystal 28 is aligned on the side of the polarizer 16b so as to have a tilt angle of 87 degrees. However, in the present invention, any other values than the foregoing may be also used if a high viewing angle characteristic is not particularly considered.

Moreover, in terms of imparting a high viewing angle characteristic as described later, it is necessary that a tilt azimuth D of the nematic liquid crystal molecule 18 on the side of the glass substrate 12b is made identical to a tilt azimuth E of the discotic liquid crystal 28 and an angle difference between the respective azimuths $d_1$ is set to about 5 degrees or less, more preferably to about 0 degrees.

Figure 3:
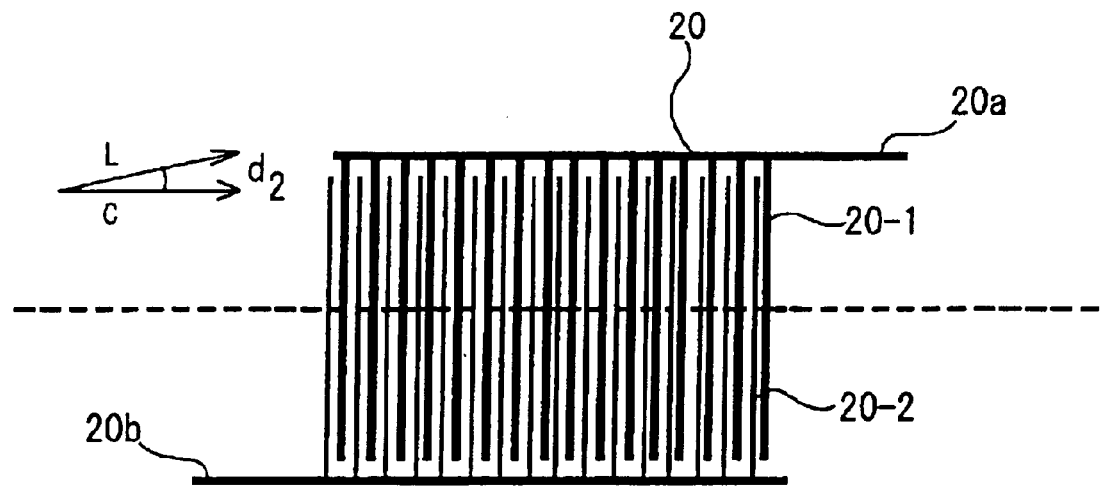
FIG. 3 is a plan view of the constitution of a comb electrode of the present invention taken as a cross section along an arrow F—F shown in FIG. 1(a).

FIG. 3 is a plan view in the case that the constitution of the comb electrode 20 described in FIG. 1(a) is cut into a cross section along an arrow F—F of FIG. 1(a) and the cross section is viewed from a direction as indicated by the arrow F. As shown in FIG. 3, two systems of electrodes, namely, a driving electrode 20a and a common electrode 20b, are coupled in the comb electrode 20, and the comb electrode 20 has a constitution including teeth 20-1 and 20-2 severally extending from the electrodes alternately toward the opposite electrodes. In the present invention, a parallel electric field is generated between the alternately extending teeth 20-1 and 20-2 of the comb electrode 20, and the liquid crystal is thereby driven. An angle $d_2$ is defined by a direction L of the rubbing process of the alignment film and by a direction C of the electric field generated by the comb electrode 20. As shown in FIG. 3, it is preferable that the angle $d_2$ is set to about 5 degrees or less. More preferably, it is preferable to set the angle $d_2$ to about 0 degrees in order to obtain a fine driving characteristic. In the following, description will be made in detail regarding a parallel electric field mode driving method of a liquid crystal display device of the present invention.

(Section B) Parallel Electric Field Mode Driving Method in the Present Invention
(B-1) Driving Voltage In the following, description will be made regarding characteristics of a liquid crystal display device of the present invention driven in accordance with a parallel electric field, while comparing a driving voltage according to the IPS method in the parallel electric field method and a driving voltage according to the parallel electric field mode driving method of the present invention. For the purpose of simplifying the following description, it should be understood that a state of interface coupling between the alignment film and the liquid crystal molecules is deemed as a strong anchoring, which refers to a state that the liquid crystal molecules are strongly fixed to the alignment film and not movable while maintaining a given tilt angle. It should be also understood that electric field intensity is assumed to be uniform at any place between the electrodes.

In the conventional IPS method, the liquid crystal shows twist deformation. In this event, a free energy $F_{IPS}$ is calculated as:

[Equation 1]

$$F_{IPS} = \frac{1}{2}\int_0^d dz \cdot \left[K_2\left(\frac{d\phi}{dz}\right)^2 - \Delta\varepsilon E^2\sin\phi\right] \quad (1)$$

In the above equation, $K_2$ denotes a twist elastic constant, (phi) denotes a twist angle and (epsilon) denotes permittivity (M. Oh-e, M. Ohta, S. Aratani, K. Kondo, Asia Display '95, 577 (1995)). Here, if the Euler-Lagrange equation is introduced to the foregoing equation (1), then it is possible to decide a critical electric field $E_c$ to enable the liquid crystal to start moving as follows:

[Equation 2]

$$E_c = \frac{\pi}{d}\sqrt{\frac{K_2}{\Delta\varepsilon}} \quad (2)$$

Meanwhile, as the liquid crystal according to the method of the present invention shows spray-bent deformation, a free energy $F_A$ is expressed as:

[Equation 3]

$$F_A = \frac{1}{2}\int_0^d dz \cdot \left[K\left(\frac{d\theta}{dz} + \frac{\pi}{2d}\right)^2 - \Delta\varepsilon E^2\cos^2\left(\theta + \frac{\pi z}{2d}\right)\right] \quad (3)$$

In the above equation, it is possible to apply a spray elastic constant $K_1$ and a bent elastic constant $K_3$ severally to K. However, for the purpose of simplifying the explanation, it is assumed that $K=K_1=K_3$ in this specification (S. Matsumoto, K. Kawamoto, K. Mizunoya, J. Appl. Phys., Vol. 47, No. 9, 3842, (1976)), and (theta) is set as a tilt angle. The tilt angle (theta) depends on an electric field E as described in the following:

[Equation 4]

$$\theta = \frac{\pi z}{2d} + \frac{\Delta\varepsilon E^2}{2K}\left(\frac{d}{\pi}\right)^2 \sin\left(\frac{\pi z}{d}\right) \quad (4)$$

Meanwhile, if an inclination of liquid crystal bulk with respect to the perpendicular of the substrate is (theta), then birefringence (delta)n view from directly above the cell is expressed as:

[Equation 5]

$$\Delta n = \frac{n_e n_o}{\sqrt{n_e^2\cos^2\theta + n_o^2\sin^2\theta}} - n_o \quad (5)$$

From the relations as described above, an electric field intensity ratio for driving according to each method of the IPS driving method and the parallel electric field mode driving method of the present invention will be decided as described in the following.

In the parallel electric field mode driving method of the present invention, assuming that physical constants of the liquid crystal are $K_1=K_3=K=14$ pN and $K_2=7$ pN, and that (delta)(epsilon)=10 (multiplied by) (epsilon)$_o$, $n_e=1.7$, $n_o=1.5$ and a cell gap as d=5 (micrometers), when an electric field $E_A=3.54$ (multiplied by) $10^5$ V/m is applied (3.5-V voltage application), the tilt angle of the liquid crystal is derived from the foregoing equation (4) as:

[Equation 6]

$$\theta = \frac{\pi z}{2d} + \sin\left(\frac{\pi z}{d}\right) \quad (6)$$

Accordingly, retardation change (delta)R in the parallel electric field mode driving method of the present invention is defined as:

[Equation 7]

$$\Delta R = \int_0^d dz \left( \frac{n_e n_o}{\sqrt{n_e^2 \cos^2\theta + n_o^2 \sin^2\theta}} - \frac{n_e n_o}{\sqrt{n_e^2 \cos^2\theta_0 + n_o^2 \sin^2\theta_0}} \right) = \quad (7)$$

$$3.0 \times 10^{-7}$$

Figure 4:
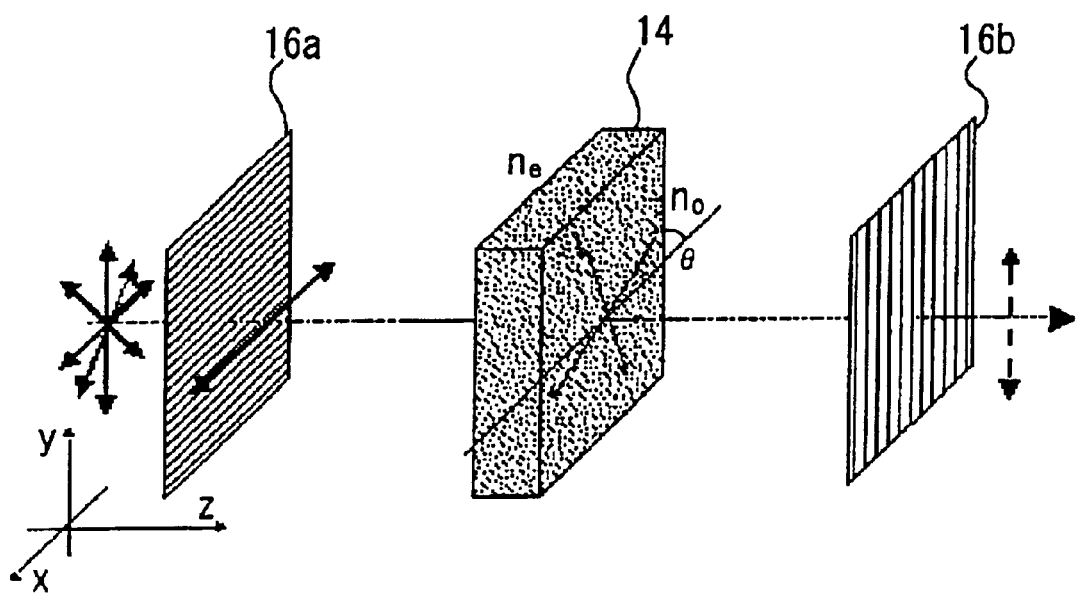
FIG. 4 is a view showing optical relations between respective elements used in the present invention.

In the foregoing equation, $(\theta)_o = (\pi)z/2d$ (the tilt angle at 0 V). From these relations and in consideration of optical relations as illustrated in FIG. 4, transmissivity T is expressed as:

[Equation 8]

$$T = \left| \frac{1}{2} \sin 2\phi \left( \cos\left(\frac{2\pi \Delta n d}{\lambda}\right) - 1 \right) \right| \quad (8)$$

Accordingly, if the light has a wavelength (lambda)=628 nm and (phi)=(pi)/4, then variation (delta)T of the transmissivity T is calculated as:

[Equation 9]

$$\Delta T = \left| \frac{1}{2} \left( \cos\left(\frac{2\pi \times 3.0 \times 10^{-7}}{628 \times 10^{-9}}\right) - 1 \right) \right| \approx 0.995 \quad (9)$$

The above calculation indicates an almost complete on-state. Here, the on-state refers to a state that the light beam which passes through the liquid crystal cell is at the maximum.

Meanwhile, an critical electric field exists in the IPS method. A value of the critical electric field is calculated by use of the physical constants of the liquid crystal described in the present invention as:

[Equation 10]

$$E_c = \frac{\pi}{5 \times 10^{-6}} \sqrt{\frac{7 \times 10^{-12}}{8.8 \times 10^{-11}}} \approx 1.8 \times 10^5 \text{ V/m} \quad (10)$$

(which corresponds to 0.9-V voltage application). The existence of the critical electric field is one of the factors for which a high driving voltage is required in the IPS method. It is understood that the voltage required for saturation of the transmissivity is 9 V at a cell gap of 5.3 (micrometers) in the IPS method, which is the driving voltage about 2.5 times higher than the voltage of 3.5 V required in the parallel electric field mode driving method of the present invention. Therefore, as described above, it is understood that adoption of the constitution of the liquid crystal cell of the present invention effectuates low voltage driving with an active matrix array.

(B-2)

In the following, description will be made further in detail regarding a viewing angle characteristic of the liquid crystal display device according to the parallel electric field mode driving method of the present invention, in comparison with a viewing angle characteristic of a liquid crystal display device according to the IPS method. Here, assumption is made that a bulk refractive index at an arbitrary portion of a liquid crystal cell possesses uniaxial anisotropy of refractive index of $n_{LC,e}$ and $n_{LC,o}$. A direction of the refractive index of $n_{LC,e}$ is defined as a z-axis, and an angle formed by the light incident on this optically anisotropic substance and the z-axis is defined as (alpha). It should be noted that the definition of the angle used in this examination is different from the angle illustrated in FIG. 4. In this event, if it is possible to design a compensator plate which compensates the bulk refractive index anisotropy with respect to all incident angles, then it is possible to widen a viewing angle.

From the above-described optically anisotropic substance, the refractive index anisotropy of a refractive index ellipsoid sensed by the incident light is expressed as:

[Equation 11]

$$\frac{n_{LC,e}}{\sqrt{1 + \left(\frac{n_{LC,e}^2}{n_{LC,o}^2} - 1\right)\cos^2 a}} \quad (11)$$

and

[Equation 12]

$$n_{LC,o} \quad (12)$$

Accordingly, it is necessary to design an optical compensator film which can cancel the anisotropy with respect to all angles, in order to widen the viewing angle.

Here, assumption is made that the optical compensator is designed by use of a film containing discotic liquid crystal and that a bulk refractive index of the discotic liquid crystal is defined as $n_{D,e}$ and $n_{D,o}$, then as similar to the foregoing equation (11) refractive index anisotropy of a refractive index ellipsoid sensed by the incident light is given by:

[Equation 13]

$$\frac{n_{D,e}}{\sqrt{1 + \left(\frac{n_{D,e}^2}{n_{D,o}^2} - 1\right)\cos^2 a}} \quad (13)$$

and

[Equation 14]

$$n_{D,o} \quad (14)$$

In other words, in order to cancel the refractive index anisotropy with respect to the incident light by an angle p, the following equation (15) needs to be satisfied in which a tilt angle of the liquid crystal is (beta), a thickness of a liquid crystal layer is $d_{LC}$ and a thickness of the optical compensator is $d_D$.

[Equation 15]

$$\frac{n_{LC,e}}{\sqrt{1 + \left(\frac{n_{LC,e}^2}{n_{LC,o}^2} - 1\right)\cos^2(p - \beta)}} d_{LC} + \quad (15)$$

$$\frac{n_{D,e}}{\sqrt{1+\left(\frac{n_{D,e}^2}{n_{D,o}^2}-1\right)\cos^2(p-\beta)}}d_D = n_{LC,o}d_{LC}+n_{D,o}d_D$$

Figure 5:
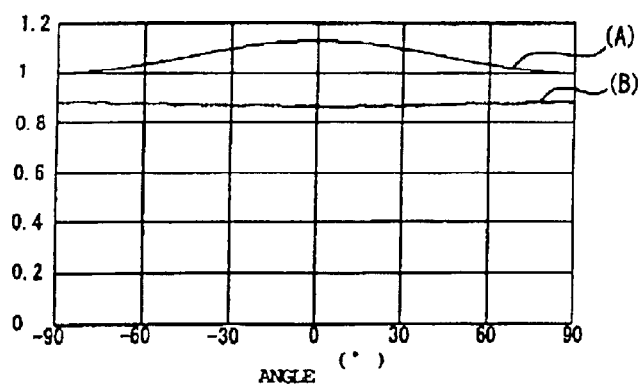
FIG. 5 is a graph showing an effect of the optical compensator used in the present invention.

Assuming that the foregoing equation (15) is applied to the present invention, dependency of values defined by the following equation (16) on angles in the case that $n_{LC,e}=n_{D,o}=1.7$ and $n_{LC,o}=n_{D,e}=1.5$ is illustrated in FIG. 5.

[Equation 16]

$$\sqrt{1+\left(\frac{n_e^2}{n_o^2}-1\right)\cos^2 x} \qquad (16)$$

In FIG. 5, a line (A) indicates viewing angle dependency of the single liquid crystal cell and a line (b) indicates a viewing angle characteristic when the optical compensator is applied. As shown in FIG. 5, it is understood that the liquid crystal cell applying the optical compensator possesses an optical characteristic which is hardly dependent on incident angles of the light. In other words, since the right member of the foregoing equation (15) does not depend on the incident angle of the light at all, it is possible to satisfy the equation (15) approximately with respect to all the incident angles by optimizing the film thickness $d_D$ of the optical compensator film, whereby widening of the viewing angle becomes feasible.

Figure 6:
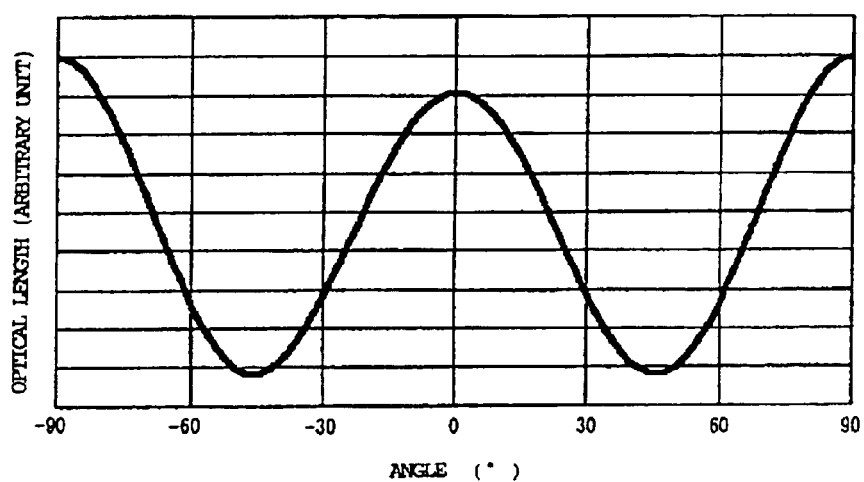
FIG. 6 is a graph showing a viewing angle characteristic according to the present invention.

Particularly when the thickness of the liquid crystal bulk is set as $d_{LC}=5$ (micrometers) in the present invention, a fine viewing angle characteristic as shown in FIG. 6 can be obtained by setting the thickness $d_D$ of the optical compensator as $d_D=30$ (micrometers). In other words, according to the parallel electric field mode driving method of the present invention, the viewing angle characteristics can be further enhanced by using the optical compensator which satisfies the foregoing characteristic.

Figure 7:
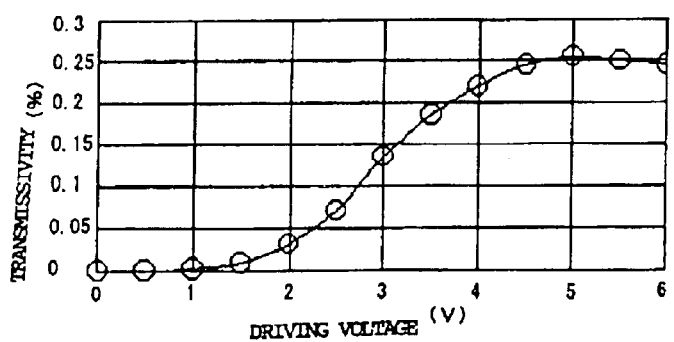
FIG. 7 is a graph showing a V-T characteristic according to a parallel electric field mode driving method of the present invention.
Figure 8:
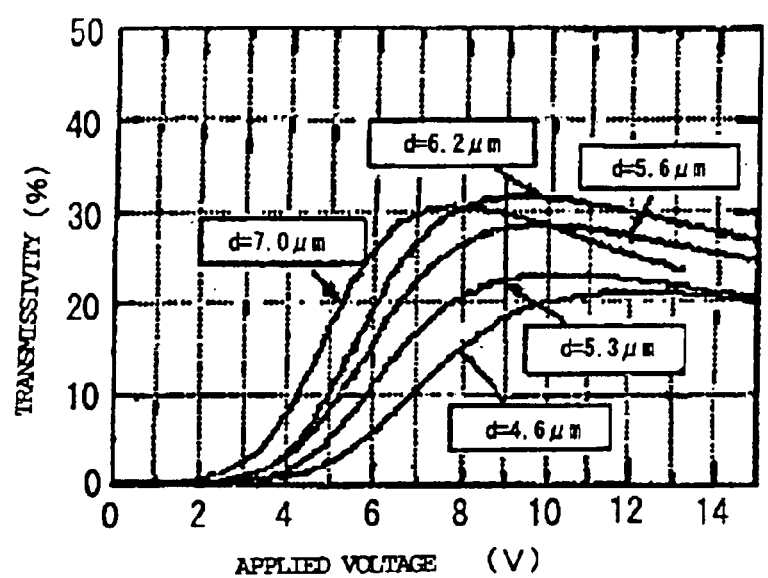
FIG. 8 is a graph showing V-T characteristics according to a conventional IPS method.

(Section C) Display Characteristic of Liquid Crystal Panel of the Present Invention The optical compensator as described in the foregoing Section B is applied to the liquid crystal cell adopting the parallel electric field mode driving method of the present invention, and a liquid crystal display characteristic thereof was studied. FIG. 7 shows a V-T characteristic of the parallel electric field mode driving method of the present invention. Meanwhile, for the purpose of comparison, a V-T characteristic of the conventional IPS driving method is shown in FIG. 8. Transmissivity shows a maximum at about 5 V in the parallel electric field mode driving method of the present invention as shown in FIG. 7, and a driving voltage in the parallel electric field mode driving method of the present invention is indicated as about 5 V. Note that the V-T characteristic shown in FIG. 7 is obtained when the cell thickness is set to 5 (micrometers). This voltage indicates that an intact driving system adoptable to an active matrix twisted nematic (TN) method can be also adopted.

Meanwhile, in the IPS method which adopts the conventional parallel electric field mode driving method as shown in FIG. 8, a voltage indicating a maximum value of transmissivity is about 7.5 V at the lowest and about 13 V at the highest. FIG. 8 also indicates that a typical driving voltage when the cell thickness thereof is set to 5.3 (micrometers), which is approximately as thick as the cell thickness of the cell used in the liquid crystal panel of the present invention, is about 9 V. As it is clear from FIG. 7 and FIG. 8, the driving voltage can be considerably reduced by adopting the parallel electric field mode driving method of the present invention.

Figure 9:
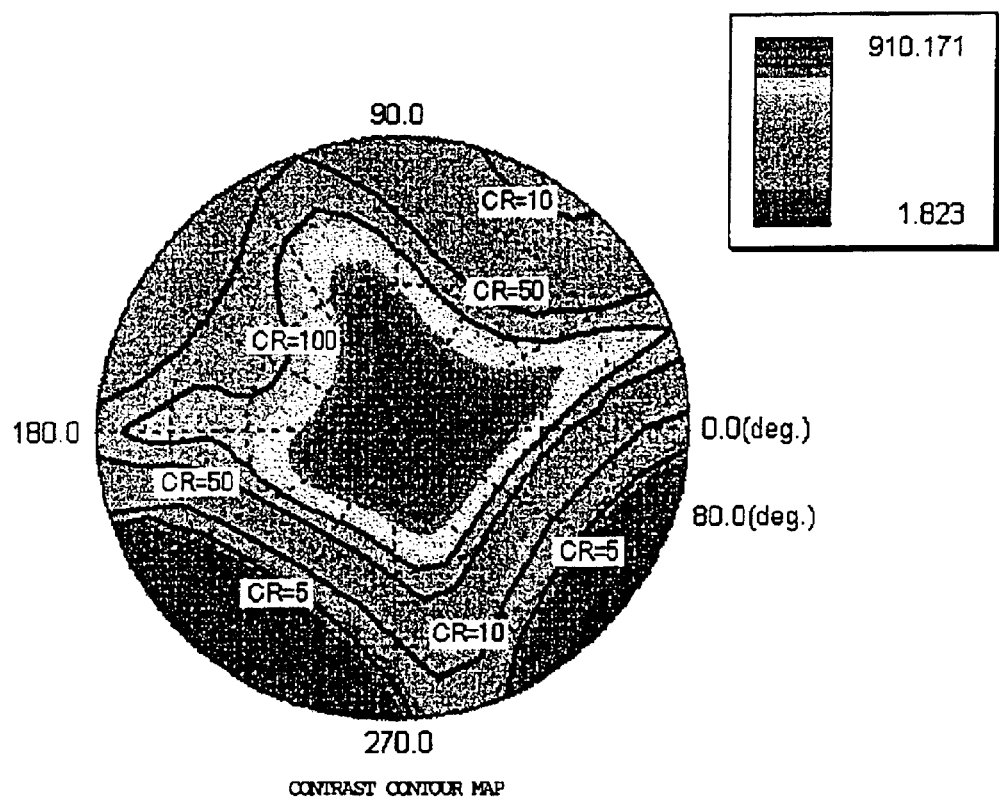
FIG. 9 is a contrast contour map in the case that the liquid crystal cell of the present invention is set to on-state.

FIG. 9 is a chart showing distribution of contrast as a contrast contour map when the liquid crystal cell of the present invention is set to an on-state. As shown in FIG. 9, an area with the contrast at 10 and above occupies a region from 130 to 160 degrees, whereby it is understood that the liquid crystal cell of the present invention possesses a fine viewing angle characteristic. In addition, as shown in FIG. 9, it is also understood that the liquid crystal cell of the present invention does not have a tone reversal area where CR (is smaller than) 1, which is observed in the TN method.

Figure 10:
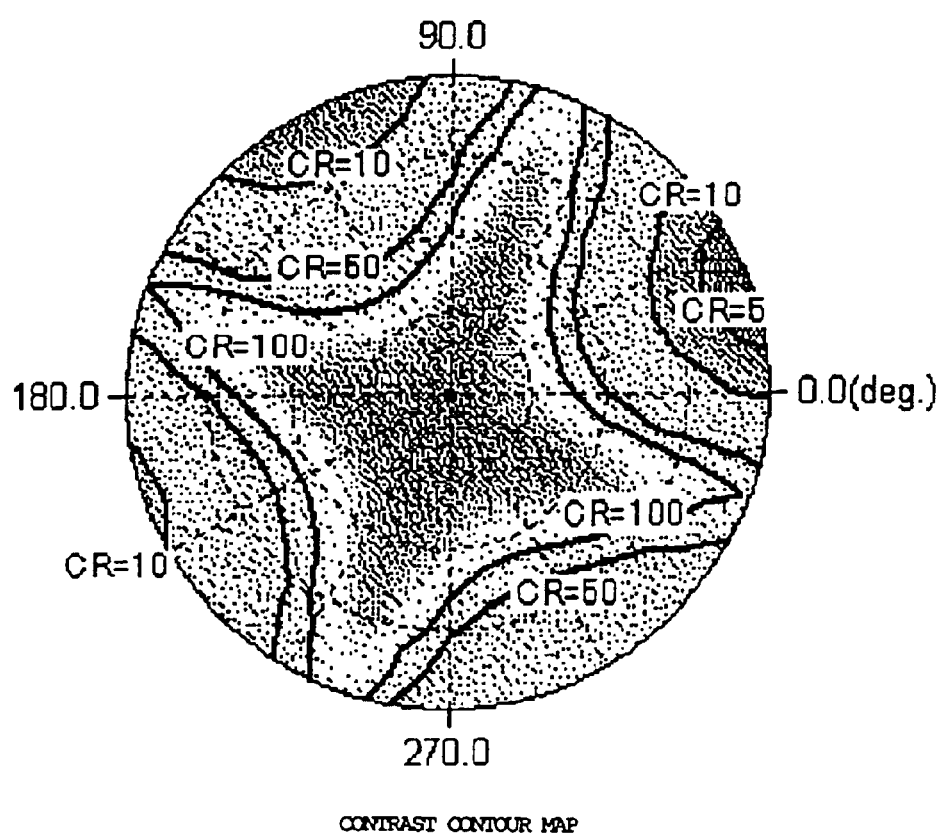
FIG. 10 is a contrast contour map in accordance with the conventional IPS driving method under a similar condition to the case in FIG. 9.

FIG. 10 shows a contrast contour map of the conventional IPS driving method, which is drawn similarly to FIG. 9. As shown in FIG. 10, comparing the contrast contour line of CR=10, for example, it is understood that the conventional IPS driving method is equivalent to the parallel electric field mode driving method of the present invention. Accordingly, viewing angle enhancement attributable to the present invention is evident.

Figure 11:
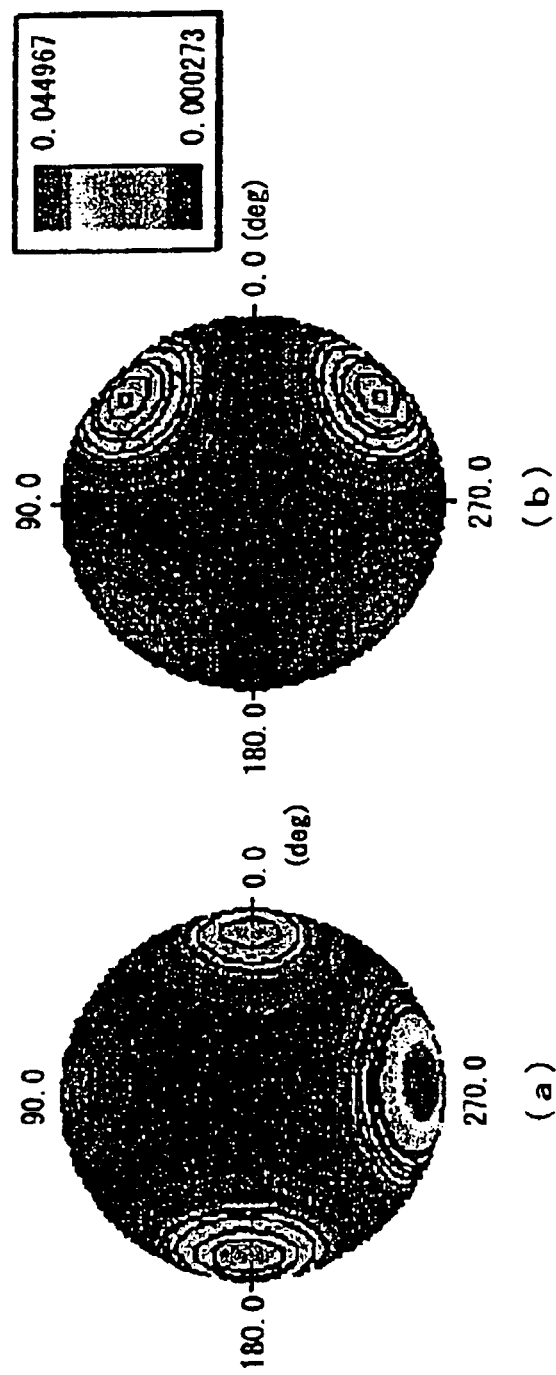
FIGS. 11(a) and 11(b) are charts showing viewing angle characteristics of the liquid crystal panel according to the present invention and a liquid crystal panel according to the conventional IPS method in the case that liquid crystal cells thereof are set to black display (off-states).

FIGS. 11(*a*) and 11(*b*) are charts showing viewing angle characteristics of the liquid crystal panel according to the present invention and the liquid crystal panel according to the conventional IPS method when the liquid crystal cells are set to black display (off-states). In FIGS. 11(*a*) and 11(*b*), transmissivity of the light beam is indicated by refractive index contour lines. FIG. 11(*a*) shows a result of the liquid crystal panel according to the present invention and FIG. 11(*b*) shows a result of the liquid crystal panel according to the conventional IPS driving method. As shown in FIG. 11(*a*), according to the present invention, small light leakage is observed at 0 degrees and 180 degrees. Moreover, considerable light leakage is observed in a position at 270 degrees. However, such leakage does not constitute a problem actually, because liquid crystal display is not usually viewed from downward. Meanwhile, light leakage is also observed in the conventional IPS method shown in FIG. 11(*b*) in an area at about 45 degrees. It is evident that the above-mentioned light leakage at about 45 degrees is greater than that of the liquid crystal cell of the present invention.

Figure 12:
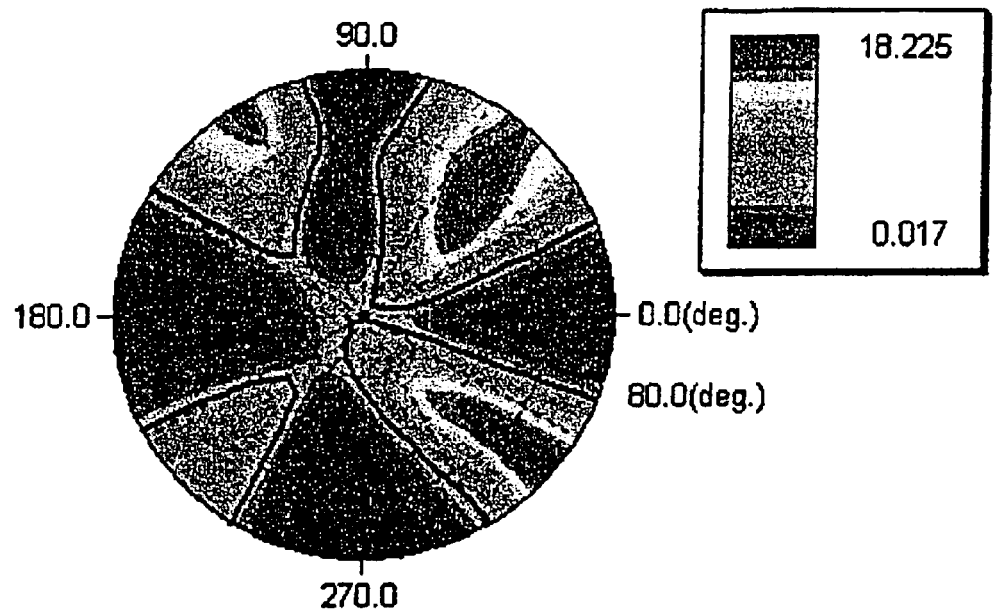
FIG. 12 is a chart showing a black display characteristic by use of a ratio ($I_2/I_1$) between transmissivity ($I_1$) of the liquid crystal panel according to the present invention and transmissivity ($I_2$) of the liquid crystal panel applying the conventional IPS driving method.

FIG. 12 shows the above-described aspect further in detail and with respect to all directions. FIG. 12 is a chart showing the viewing angle characteristics of the respective liquid crystal panel shown in FIGS. 11(*a*) and 11(*b*) by use of a ratio ($I_2/I_1$) between transmissivity ($I_1$) of the liquid crystal panel according to the present invention and transmissivity ($I_2$) of the liquid crystal panel using the conventional IPS driving method. In FIG. 12, a bright part indicates that the liquid crystal panel according to the conventional IPS driving method shows more light leakage. In other words, if there are more bright parts in FIG. 12, such an aspect indicates that the liquid crystal cell adopting the present invention shows less light leakage in the context of the black display characteristic and is capable of providing fine black display. Moreover, a thick line illustrated in FIG. 12 is a contour line where the ratio ($I_2/I_1$) is equal to 1.0. As shown in FIG. 12, according to the parallel electric field mode driving method of the present invention, the bright part becomes wider and the portion other than the bright part becomes darker. Accordingly, it is understood that the liquid crystal cell according to the present invention has a better black display characteristic owing to improvement in light leakage with respect to the viewing angle in comparison with the liquid crystal cell according to the conventional IPS method.

Figure 13:
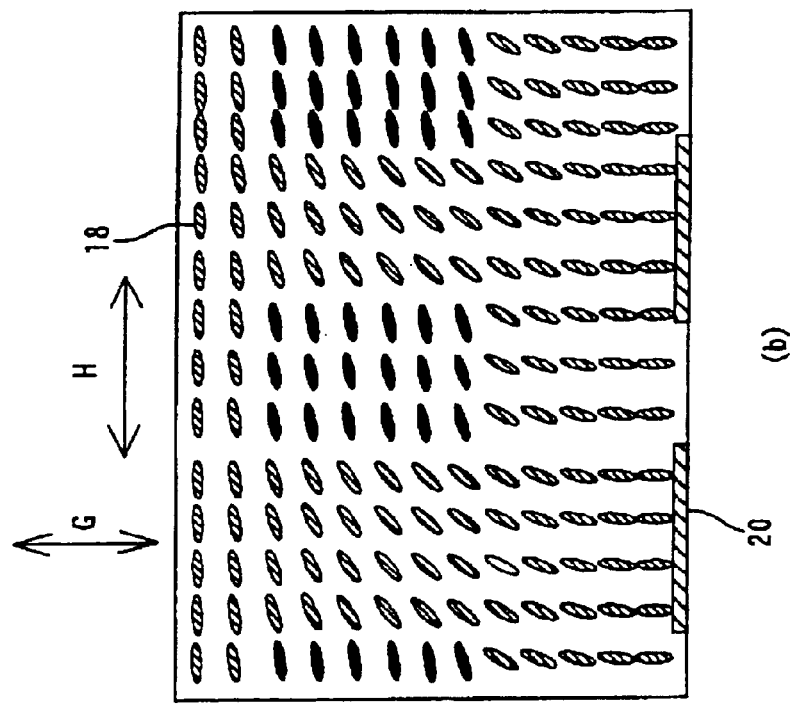
Figure 13:
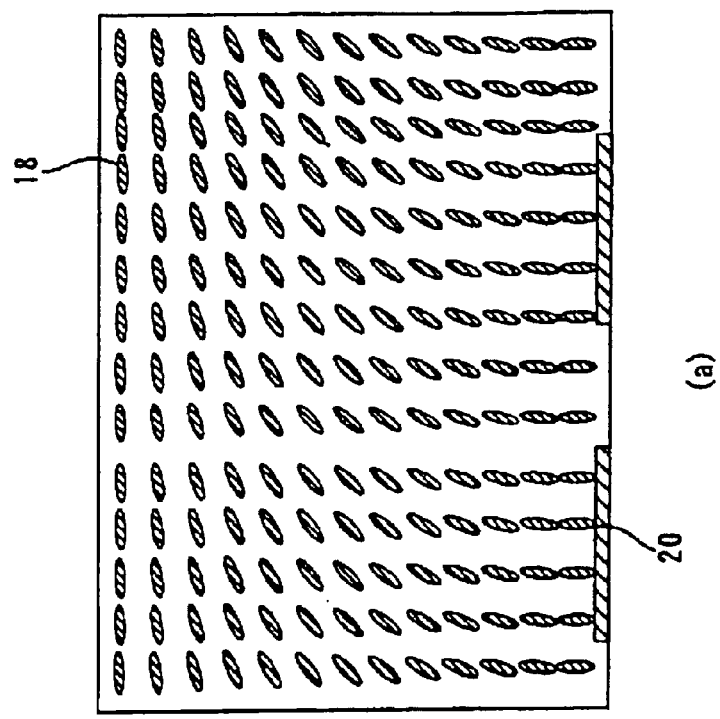

FIGS. 13(*a*) and 13(*b*) are views schematically showing alignment variation of the liquid crystal when the driving voltage to the liquid crystal panel of the present invention is set to 0 V (FIG. 13(*a*)) and to 5 V (FIG. 13(*b*)). In FIGS.

13(a) and 13(b) indicate positions of the comb electrodes 20 by shaded areas and also indicate that the nematic liquid crystal molecules 18 are held inside the cell.

Figure 18:
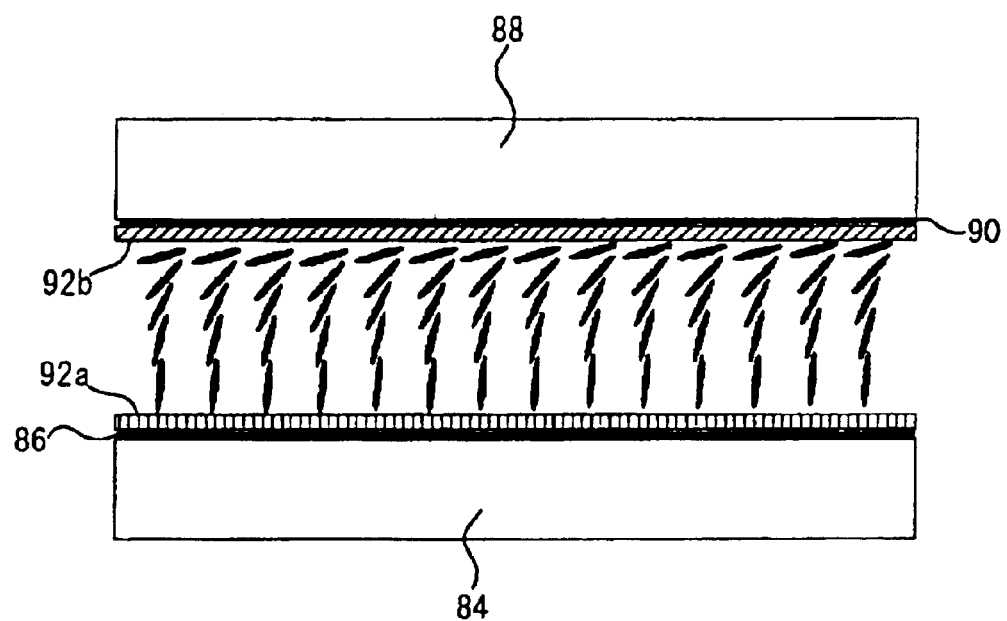
FIG. 18 is a schematic cross-sectional view of a liquid crystal cell used in the conventional HAN mode driving method.

Moreover, as shown in FIG. 13(a), when the applied voltage is at 0 V, the nematic liquid crystal molecules 18 in the liquid crystal panel of the present invention are aligned similarly to the HAN mode driving method as shown in FIG. 18. In the liquid crystal panel shown in FIG. 13(a), when electric fields are generated by applying the voltage between the comb electrodes 20, an electric field is formed above each of the comb electrodes 20 largely in line with a direction indicated by an arrow G. Meanwhile, an electric field is generated between the comb electrodes 20 in the direction of the cell thickness as indicated by an arrow H. According to the parallel electric field mode driving method of the present invention, the nematic liquid crystal molecules 18 located between the comb electrodes 20 largely change directors by inclining more in accordance with the electric field generated along the direction as indicated by the arrow H. By the above-described alignment variation of the nematic liquid crystal, on-and-off control for display in the liquid crystal cell of the present invention is effectuated.

Figure 14:
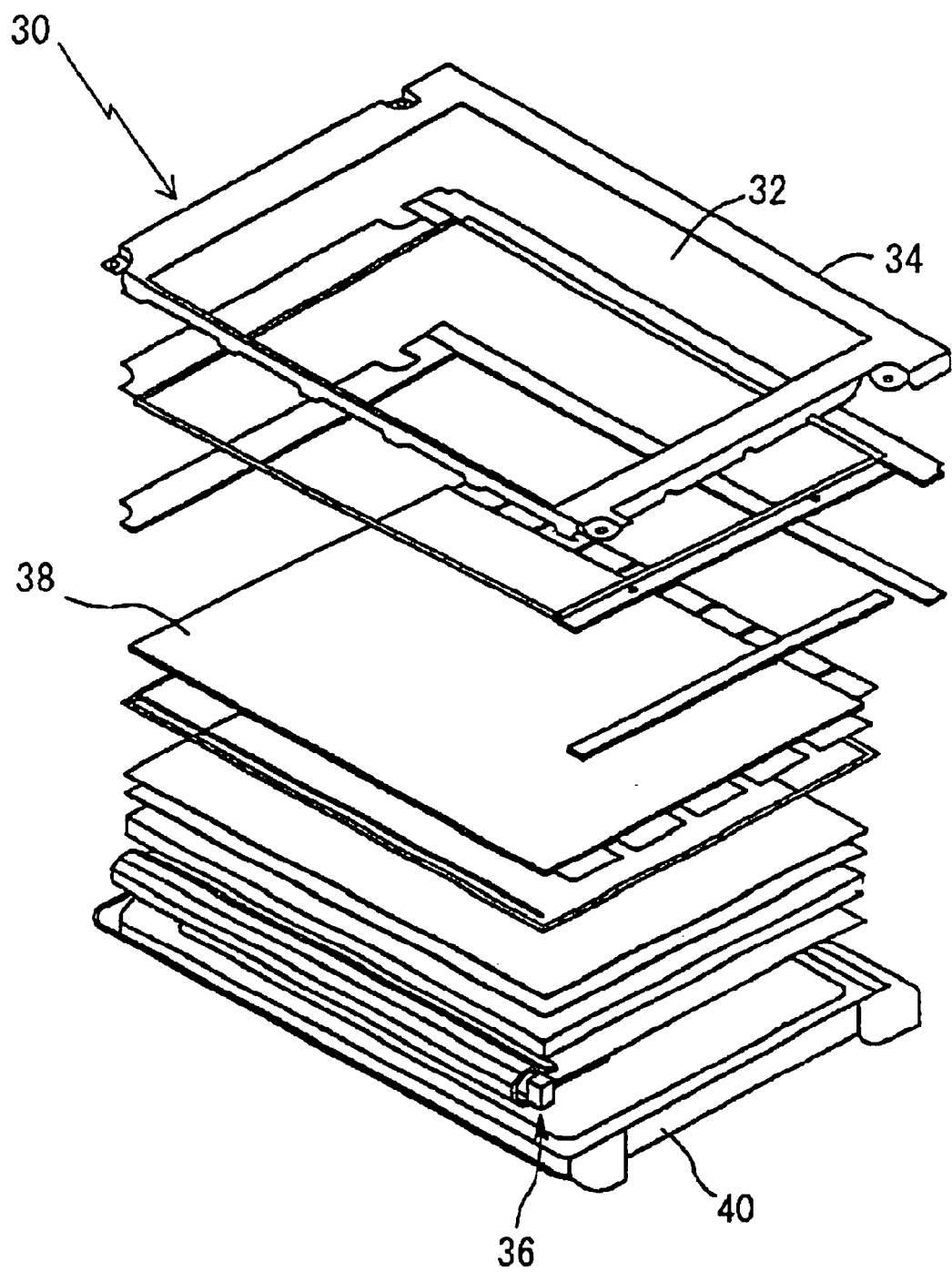
FIG. 14 is an exploded perspective view of a transmissive liquid crystal display device including the liquid crystal panel according to the present invention.
Figure 15:
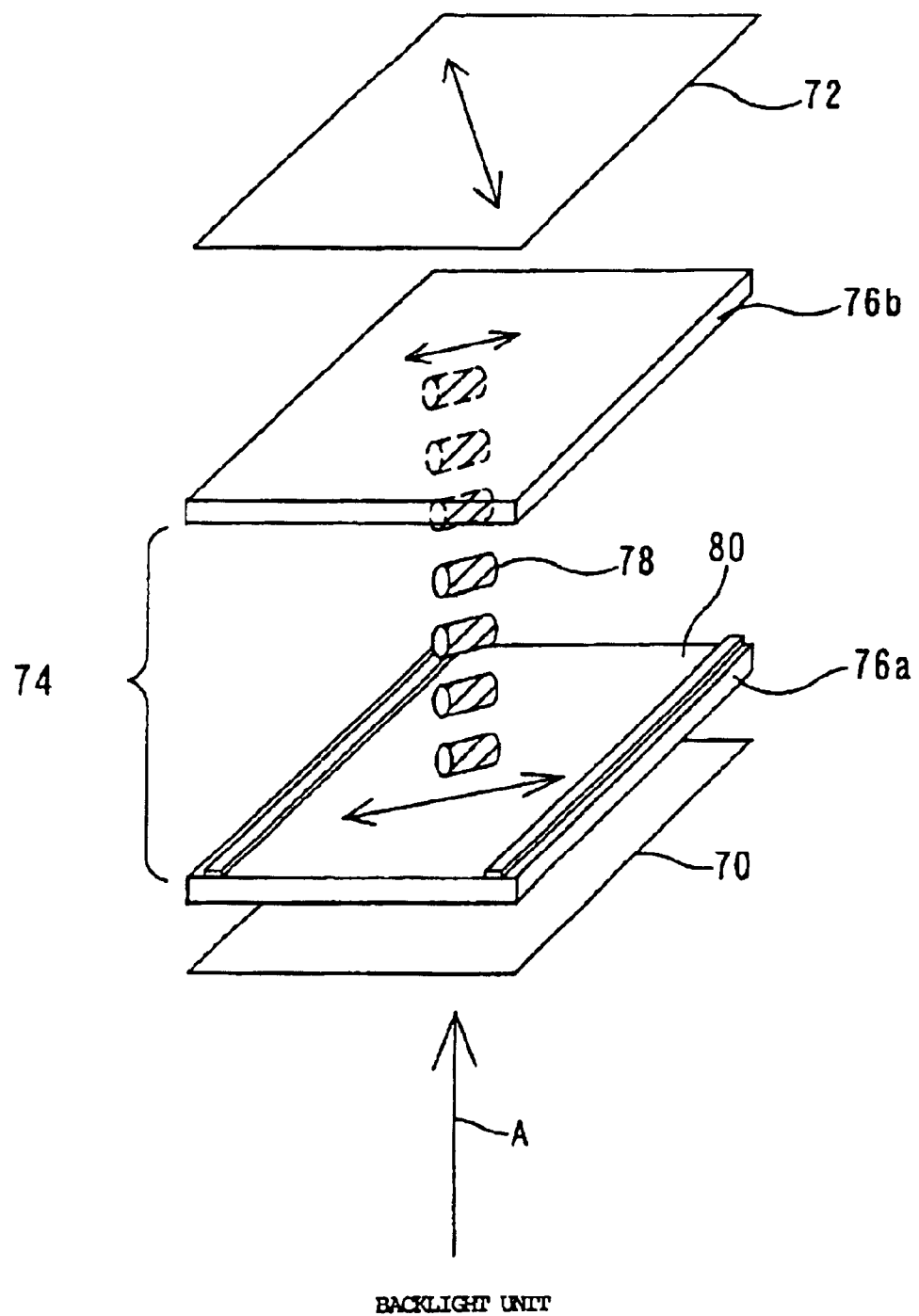
FIG. 15 is an exploded perspective view schematically showing a liquid crystal panel for driving liquid crystal by the conventional IPS method.
Figure 16:
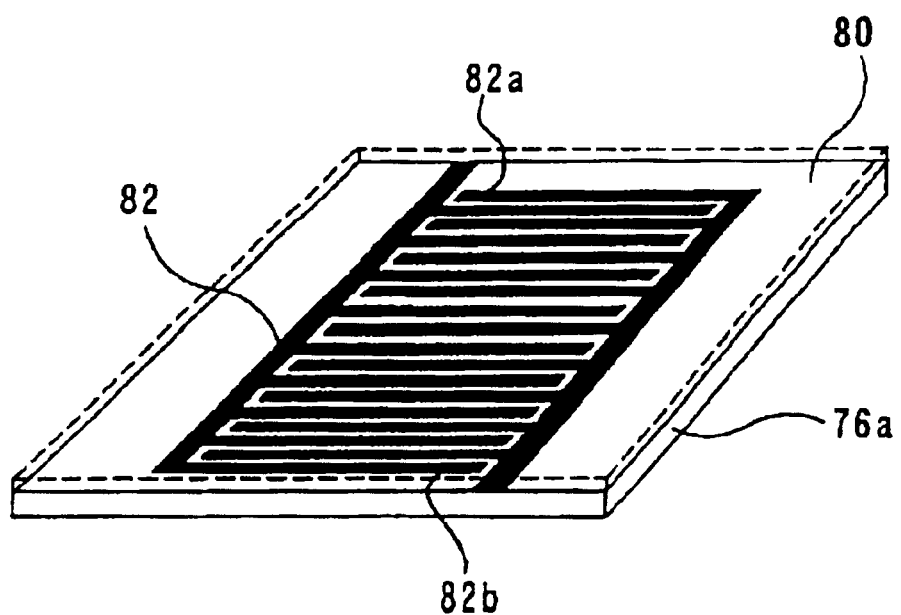
FIG. 16 is a detailed perspective view of a comb electrode which is usable in the liquid crystal panel illustrated in FIG. 15.
Figure 17:
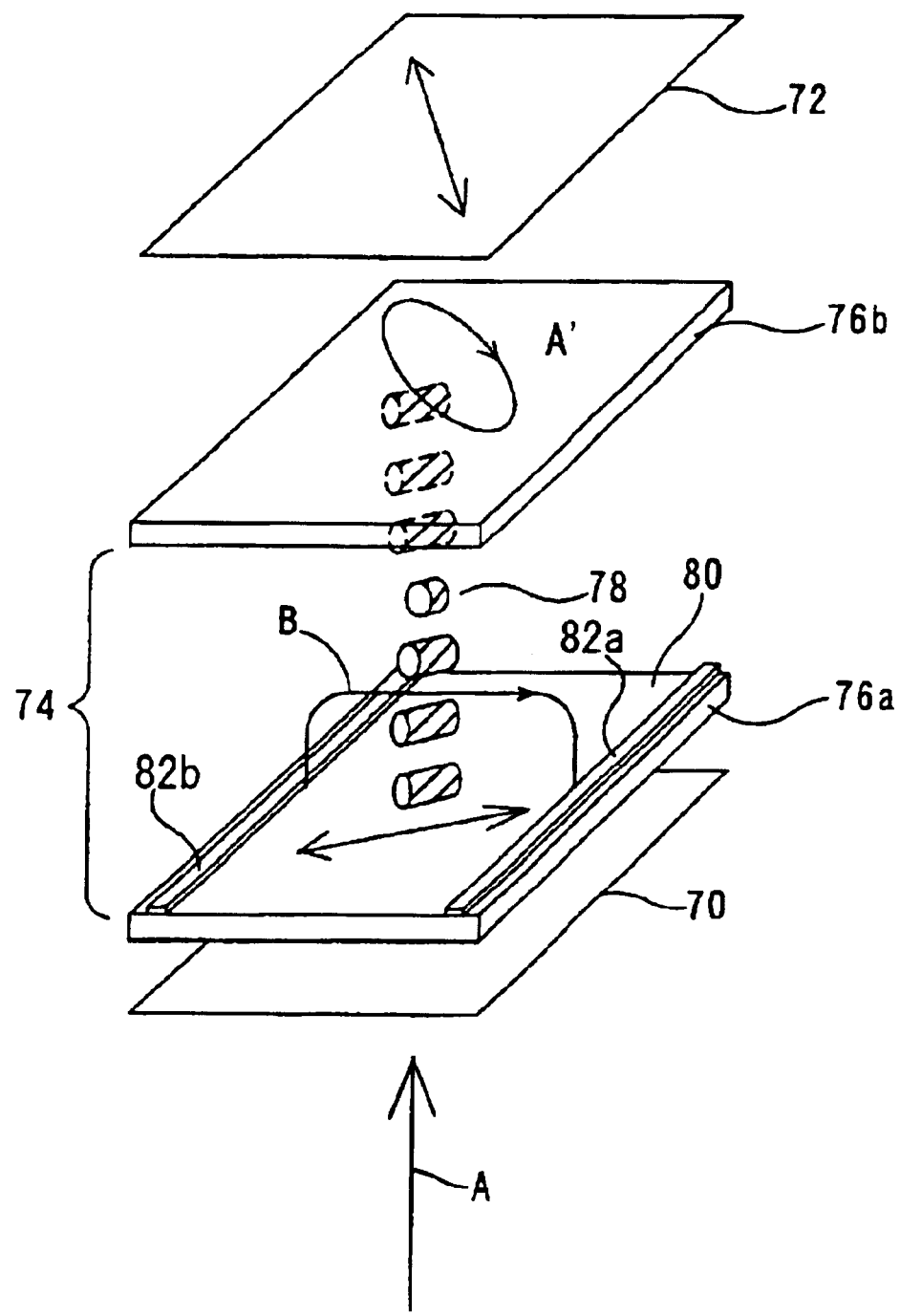
FIG. 17 is a view showing movement of the liquid crystal and a direction of an electric field in the case when an electric field is applied from the comb electrode 82 to the liquid crystal panel illustrated in FIG. 15.

FIG. 14 is an exploded perspective view of a transmissive liquid crystal display device 30 including the liquid crystal panel according to the present invention. The transmissive liquid crystal display device 30 according to the embodiment of the present invention shown in FIG. 14 includes an upper frame 34 for defining a display window 32 for defining an effective screen of the transmissive liquid crystal display device 30, a backlight unit 36 and the liquid crystal panel 38 of the present invention which is disposed between the upper frame 34 and the backlight unit 36.

The backlight unit 36 is placed on a lower case 40. The backlight unit 36 is held integrally with the upper frame 34, thus collectively constituting the transmissive liquid crystal display device 30. The backlight unit 36 shown in FIG. 14 allows a light beam irradiated from a fluorescent tube or the like to be discharged efficiently toward the liquid crystal panel 38 of the present invention, thus effectuating fine display. The liquid crystal panel 38 of the present invention includes the liquid crystal cell constituted in accordance with the present invention and an unillustrated active matrix array substrate having structured for sending appropriate driving signals to the liquid crystal cell. The liquid crystal cell is driven in accordance with operating voltages of the active matrix array substrate. Moreover, the above-described optical compensator is used in the liquid crystal cell included in the liquid crystal display device 30 of the present invention to provide a high viewing angle characteristic.

Although the present invention has been described in accordance with the particular embodiment, it should be understood that the present invention is not limited to the foregoing particular embodiment. Regarding the materials, the cell structure, the electrodes, the active matrix array substrate and other members such as the optical compensator, the present invention can apply any parts of the prior art where it is appropriate.

Although the preferred embodiment of the present invention has been described in detail, it should be understood that various changes, substitutions and alternations can be made therein without departing from spirit and scope of the inventions as defined by the appended claims.

What is claimed is:

1. A liquid crystal panel comprising:
   a cell formed between substrates, the substrates being disposed to face each other and severally including alignment films;
   liquid crystal molecules held in the cell; and
   an electrode for applying a driving electric field in a direction parallel to a surface of the substrates, wherein said electrode comprises plural pairs of comb electrodes which form driving electric fields for driving the liquid crystal molecules,
   wherein the alignment film disposed on the substrate to cover the electrode and the alignment film disposed on the opposite substrate are severally selected from a horizontal alignment film and a perpendicular alignment film which are mutually different in aligning modes, and
   wherein said liquid crystal molecules each comprise different alignment angles and have an increasingly inclined alignment in relation to said electrode in an unactivated state.

2. The liquid crystal panel according to claim 1, wherein the perpendicular alignment film is disposed adjacently to the electrode.

3. The liquid crystal panel according to claim 1, wherein an alignment direction of the horizontal alignment film is set within 10 degrees with respect to the direction of the electric fields in a parallel direction generated by the comb electrodes.

4. The liquid crystal panel according to claim 1, wherein a tilt angle of the horizontal alignment film is set in a range from 70 to 90 degrees with respect to a thickness direction of the cell, and a tilt angle of the perpendicular alignment film is set in a range from 0 to 30 degrees with respect to the thickness direction of the cell.

5. The liquid crystal panel according to claim 1, wherein an optical compensator is disposed on the liquid crystal panel adjacently to any one of the substrate where the comb electrodes are formed and the opposite substrate, the optical compensator includes discotic liquid crystal molecules, and the discotic crystal molecules are selected from horizontal alignment and perpendicular alignment which are different from each other severally on a side adjacent to the substrate and on a side facing the substrate.

6. The liquid crystal panel according to claim 1, wherein the liquid crystal molecules are nematic liquid crystal molecules.

7. A liquid crystal display device comprising:
   a liquid crystal panel including
   a cell formed between substrates which are disposed to face each other and severally include alignment films,
   liquid crystal molecules held in the cell, and
   an electrode for applying a driving electric field in a direction parallel to a surface of the substrates wherein said electrode comprises plural pairs of comb electrodes which form driving electric fields for driving the liquid crystal molecules; and
   a backlight unit,
   wherein the alignment film disposed on the substrate to cover the electrode and the alignment film disposed on the opposite substrate are severally selected from a horizontal alignment film and a perpendicular alignment film which are mutually different in aligning modes, and
   wherein said liquid crystal molecules each comprise different alignment angles and have an increasingly inclined alignment in relation to said electrode in an unactivated state.

8. The liquid crystal display device according to claim 7, wherein the perpendicular alignment film is disposed adjacently to the electrode.

9. The liquid crystal display device according to claim 7, wherein an alignment direction of the horizontal alignment film is set within 10 degrees with respect to the direction of the electric fields in a parallel direction generated by the comb electrodes.

10. The liquid crystal display device according to claim 7, wherein a tilt angle of the horizontal alignment film is set in a range from 70 to 90 degrees with respect to a thickness direction of the cell, and a tilt angle of the perpendicular alignment film is set in a range from 0 to 30 degrees with respect to the thickness direction of the cell.

11. The liquid crystal display device according to claim 7, wherein an optical compensator is disposed on the liquid crystal panel on the opposite substrate, on any one of a side of adjacent to the liquid crystal molecules and an opposite face thereto, the optical compensator includes discotic liquid crystal molecules, and the discotic liquid crystal molecules are selected from horizontal alignment and perpendicular alignment which are different from each other severally on a side of the adjacent substrate and on a side facing to the substrate.

12. The liquid crystal display device according to claim 7, wherein the liquid crystal molecules are nematic liquid crystal molecules.

13. The liquid crystal display device according to claim 7, wherein said liquid crystal molecules comprise an orientation pattern where said liquid crystal molecules gradually change alignment variation from being parallel to being perpendicular to said electrode.

14. The liquid crystal display device according to claim 7, wherein said liquid crystal molecules comprise a non-uniformly aligned orientation pattern.

15. A driving method for a liquid crystal display device including a liquid crystal panel having a cell formed between substrates disposed to face each other and severally including alignment films, liquid crystal molecules held in the cell and an electrode for applying a driving electric field in a direction parallel to a surface of the substrates, and a backlight unit, method comprising:

generating a parallel electric field by the electrode formed on at least one of the substrates and disposed on a side facing the liquid crystal molecules;

generating the parallel electric field from plural pairs of comb electrodes for forming a driving voltage to drive the liquid crystal molecules;

aligning the liquid crystal molecules by the parallel electric field;

transmitting a light beam from the backlight unit through the cell after polarizing the light beam; and controlling the transmission of the light beam by applying and canceling the parallel electric field, wherein said liquid crystal molecules each comprise different alignment angles and have an increasingly inclined alignment in relation to said electrode in an unactivated state.

16. The driving method for a liquid crystal display device according to claim 15, wherein the transmitting of the light beam through the cell includes transmitting the polarized light beam through alignment films severally selected from a horizontal alignment film and a perpendicular alignment film of mutually different aligning modes.

17. The driving method for a liquid crystal display device according to claim 15, wherein the method further comprises generating the parallel electric field on a side of the perpendicular alignment film.

18. The driving method for a liquid crystal display device according to claim 15, wherein the method further comprise generating the parallel electric field within 10 degrees with respect to an alignment direction of the horizontal alignment film.

19. The driving method for a liquid crystal display device according to claim 15, wherein a tilt angle of the horizontal alignment film is set in a range from 70 to 90 degrees with respect to a thickness direction of the cell, and a tilt angle of the perpendicular alignment film is set in a range from 0 to 30 degrees with respect to the thickness direction of the cell.

20. The driving method for a liquid crystal display device according to claim 15, wherein the transmitting of the light beam includes a step of transmitting the light beam through an optical compensator, which is disposed adjacently to an opposite side to a side abutting on the liquid crystal molecules of the substrate facing to the substrate where the comb electrodes are formed, the optical compensator includes discotic liquid crystal molecules, and the discotic liquid crystal molecules are selected from horizontal alignment and perpendicular alignment which are different from each other on a side adjacent to the substrate and on a side facing the substrate.

* * * * *